US012396442B2

(12) United States Patent
Ling et al.

(10) Patent No.: US 12,396,442 B2
(45) Date of Patent: Aug. 26, 2025

(54) MONOCULAR UNDERWATER CAMERA BIOMASS ESTIMATION

(71) Applicant: TidalX AI Inc, San Ramon, CA (US)

(72) Inventors: Julia Black Ling, Redwood City, CA (US); Laura Valentine Chrobak, Menlo Park, CA (US)

(73) Assignee: TidalX AI Inc., Mountain View, CA (US)

( * ) Notice: Subject to any disclaimer, the term of this patent is extended or adjusted under 35 U.S.C. 154(b) by 455 days.

(21) Appl. No.: 17/729,703

(22) Filed: Apr. 26, 2022

(65) Prior Publication Data

US 2023/0337640 A1 Oct. 26, 2023

(51) Int. Cl.
| | |
|---|---|
| *A01K 61/95* | (2017.01) |
| *A01K 29/00* | (2006.01) |
| *A01K 61/10* | (2017.01) |
| *A01K 61/80* | (2017.01) |
| *G06T 7/593* | (2017.01) |

(52) U.S. Cl.
CPC ............ *A01K 61/95* (2017.01); *A01K 29/005* (2013.01); *A01K 61/10* (2017.01); *A01K 61/80* (2017.01); *G06T 7/593* (2017.01)

(58) Field of Classification Search
None
See application file for complete search history.

(56) References Cited

U.S. PATENT DOCUMENTS

| | | | |
|---|---|---|---|
| 2023/0267731 A1* | 8/2023 | Shang | G06T 7/70 382/110 |
| 2023/0301280 A1* | 9/2023 | Aljapur | G06T 7/13 |
| 2024/0029347 A1* | 1/2024 | Seyrek Pierre | G06V 10/25 |

* cited by examiner

*Primary Examiner* — Vikkram Bali
(74) *Attorney, Agent, or Firm* — Fish & Richardson P.C.

(57) ABSTRACT

Methods, systems, and apparatus, including computer programs encoded on computer-storage media, for monocular underwater camera biomass estimation. In some implementations, an exemplary method includes obtaining a plurality of images of fish captured by a monocular underwater camera; providing the plurality of images that were captured by the monocular underwater camera to a first model trained to detect one or more fish within the plurality of images; generating one or more values for each detected fish as a set of values; generating a biomass distribution of the fish based on the set of values; and determining an action based on the biomass distribution.

19 Claims, 4 Drawing Sheets

MONOCULAR UNDERWATER CAMERA BIOMASS ESTIMATION

FIELD

This specification generally relates to cameras that are used for biomass estimation, and particularly to underwater cameras that are used for aquatic livestock.

BACKGROUND

A population of farmed fish may include fish of varying sizes, shapes, and health conditions. In the aquaculture context, prior to harvesting, a worker may remove some fish from the fish pen and weigh them. The manual process of removing the fish from the fish pen and weighing them is both time intensive and potentially harmful to the fish. In addition, because only a small portion of a fish population may be effectively measured in this way, the true characteristics of the population remain unknown.

SUMMARY

In general, innovative aspects of the subject matter described in this specification relate to estimating the biomass of aquatic livestock using monocular underwater camera systems. Individual fish can be photographed using a single underwater camera. Images from the underwater camera can be processed using computer vision and machine learning-based techniques to identify fish within the images and to determine features, e.g., truss lengths, on the fish. Biomass estimations are generated by a model (e.g., neural network, Random Forest Regressor, Support Vector Regressor, or Gaussian Process Regressor, among others) that is trained to generate predicted biomass based, e.g., on truss lengths. The biomass of fish populations may be used to control the amount of feed given to a fish population, e.g., by controlling a feed distribution system, as well as to identify and isolate runt, diseased, or other sub-populations.

One innovative aspect of the subject matter described in this specification is embodied in a method that includes obtaining a plurality of images of fish captured by a monocular underwater camera; providing the plurality of images that were captured by the monocular underwater camera to a first model trained to detect one or more fish within the plurality of images; generating one or more values for each detected fish as a set of values; generating a biomass distribution of the fish based on the set of values; and determining an action based on the biomass distribution.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, in some implementations, generating the biomass distribution of the fish based on the set of values includes providing the set of values to a second model trained to estimate biomass distributions; and obtaining output of the second model as the biomass distribution of the fish.

In some implementations, the one or more values for each detected fish include a value that indicates a length between a first point on a particular fish of the fish and a second point on the particular fish.

In some implementations, actions include detecting the first point and second point on the particular fish. In some implementations, the action includes adjusting a feeding system providing feed to the fish.

In some implementations, the action includes sending data including the biomass estimate to a user device, where the data is configured to, when displayed on the user device, present a user of the user device with a visual representation of the biomass estimate.

In some implementations, actions include obtaining data from the monocular underwater camera indicating a current operation status of the monocular underwater camera; and in response to obtaining the plurality of images from the monocular underwater camera, providing the plurality of images to the first model.

An advantage of the methods, systems, and apparatuses described herein includes reducing reliance on hardware for obtaining depth data from an environment such as hardware for stereo cameras, light based depth detection, among others, e.g., by using processes to generate accurate biomass estimations from images captured by monocular or single lens cameras. When a setup of stereo cameras is used, depth information can be determined from the visual differences of objects captured by the two or more cameras of the stereo camera setup. However, if a stereo camera setup is damaged, is partially obscured, or is partially made non-functional, processes that rely on depth information of the stereo camera may not function properly. Similarly, stereo camera setups generally are more expensive to produce, calibrate, and maintain than single camera equivalents. Stereo camera setups can also be less efficient by requiring greater amounts of image data to be transferred to processing elements compared to single camera equivalents.

Solutions described herein specify the use of two-dimensional (2d) truss networks to determine biomass distributions for a population. Typically, truss networks are computed in three dimensions to account for changes in apparent distances between key points based on a position of a fish or other object in three dimensions. However, this approach relies on hardware for obtaining depth data from an environment such as hardware for stereo cameras, light based depth detection, among others. Solutions described herein specify the use of a model trained with 2d truss networks to generate an accurate biomass distribution prediction for a population of fish.

Other possible solutions, such as a time of flight (ToF) sensor present further issues, including environmental effects, that can affect accuracy. For example, ToF sensors or other depth sensors can detect debris within an environment, such as water, as objects for distance measurement. The variable debris in the environment can similarly present issues in determining a correlation of time for reflection and actual distance as the time may depend on the amount of debris in the environment.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
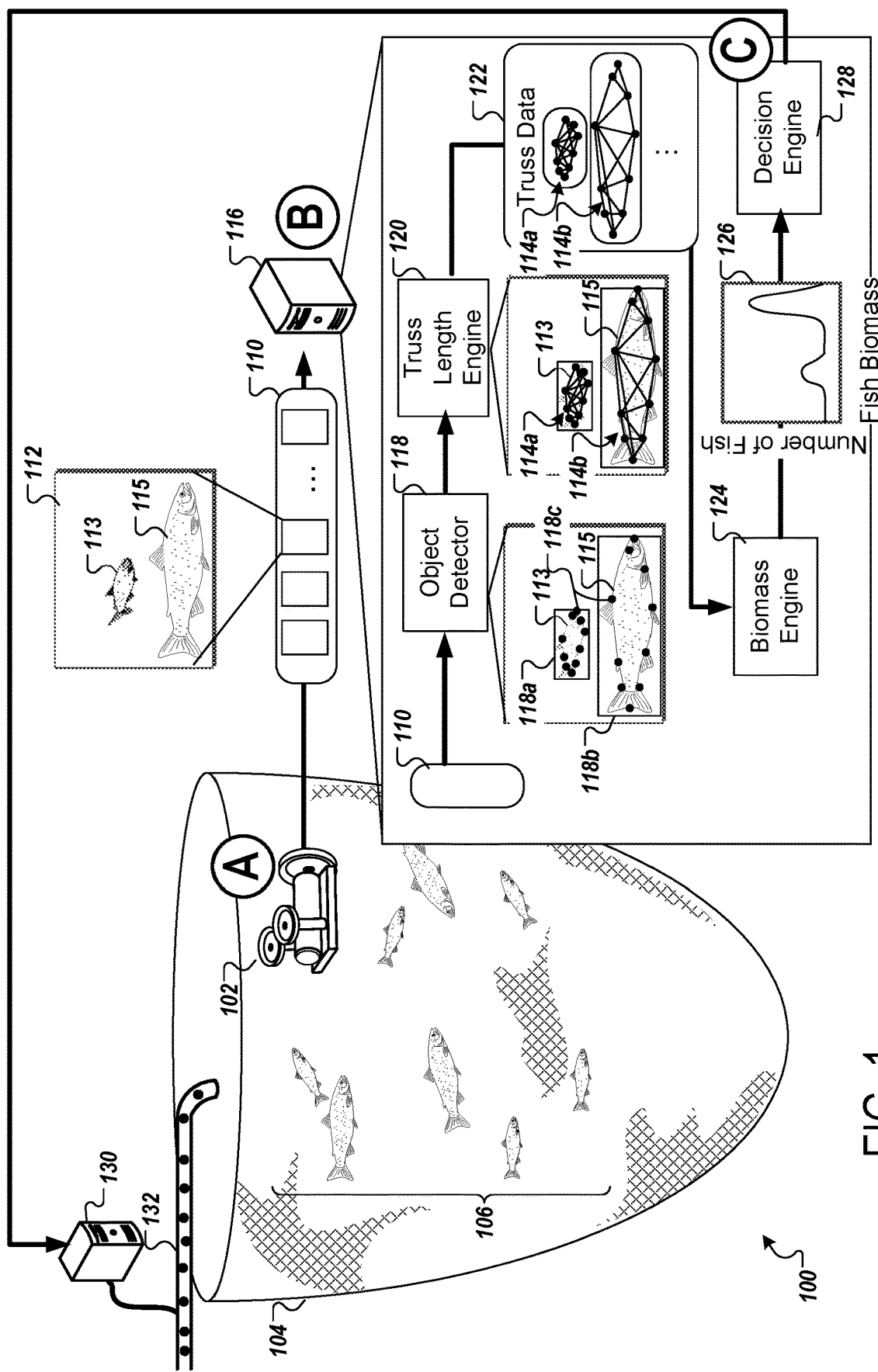
FIG. 1 is a diagram showing an example of a system that is used for monocular underwater camera biomass estimation.

FIG. 1 is a diagram showing an example of a system 100 that is used for underwater camera biomass estimation. The system 100 includes a control unit 116 and an underwater camera device 102. Generally speaking, the control unit 116 obtains images captured by a camera of the camera device 102 and processes the images to generate biomass estimations for one or more fish. The biomass estimations for one or more fish can be processed to determine actions such as feed adjustment, sorting, model training, and user report feedback, among others.

In some implementations, the control unit 116 includes one or more components for processing data. For example, the control unit 116 can include an object detector 118, truss length engine 120, biomass engine 124, and a decision engine 128. Components can include one or more processes that are executed by the control unit 116.

At least one of the one or more cameras of the camera device 102 includes a camera that captures images from a single viewpoint at a time. This type of camera may be referred to as a monocular camera. Where a stereo camera setup can include multiple cameras each capturing a unique viewpoint at a particular time, a monocular camera captures one viewpoint at a particular time. A computer processing output of a stereo camera setup can determine, based on differences in the appearance of objects in one viewpoint compared to another viewpoint at a particular time, depth information of the objects.

In some implementations, the camera device 102 has one or more cameras in a stereo camera setup that are non-functional or obscured, e.g., by debris or other objects, including fish or other animals, in an environment. In some implementations, the control unit 116 can process one or more images from the camera device 102, or obtain a signal from the camera device 102, indicating that one or more cameras of the camera device 102 are obscured or non-functional or the camera device 102 is operating with a monocular camera. The control unit 116 can adjust a processing method based on the status of the cameras of the camera device 102, such as a stereo setup status or a monocular camera setup status. In some implementations, a monocular underwater camera includes stereo camera setups that have become, operationally, a monocular camera setup based on non-functioning elements, debris, among other causes. In some cases, stereo camera setups can obtain images from a single viewpoint at a given time and be considered, operationally, a monocular camera.

In some implementations, the camera device 102 includes a single camera. For example, the single camera can be a monocular camera that captures a single viewpoint at a time. In some implementations, the camera device 102 with a single camera is more efficient to produce and maintain, more economical, and can be more robust with fewer components prone to failure.

The system 100 also includes a feed controller unit 130 that controls the feed delivered by feed system 132. The feed controller unit 130 can include components configured to send control messages to actuators, blowers, conveyers, switches, or other components of the feed system 132. The control messages can be configured to stop, start, or change a meal provided to fish 106 in pen 104.

In this example, the camera device 102 includes propellers to move the camera device 102 around the fish pen 104. In general, the camera device 102 may use any method of movement including ropes and winches, waterjets, thrusters, tethers, buoyancy control apparatus, chains, among others.

In some implementations, the camera device 102 is equipped with the control unit 116 as an onboard component, while in other implementations, the control unit 116 is not affixed to the camera device 102 and is external to the camera device 102. For example, the camera device 102 may provide images 112 and 114 over a network to the control unit 116. Similarly, the control unit 116 can provide return data, including movement commands to the camera device 102 over the network.

Stages A through C of FIG. 1, depict image data 110, including image 112, obtained by the camera device 102 that are processed by the control unit 116. The image 112 includes representations of the fish 113 and 115. Images of fish obtained by the camera device 102 may include fish in any conceivable pose including head on, reverse head on, or skewed.

In stage A, the camera device 102 obtains the image data 110 including image 112 of the fish 113 and 115 within the pen 104. The camera device 102 provides the data 110 to the control unit 116. In some implementations, the camera device 102 obtains multiple images and provides the multiple images, including the image 112, to the control unit 116.

In stage B, the control unit 116 processes the images of the data 110, including the image 112. The control unit 116 provides the data 110 to the object detector 118. The object detector 118 can run on the control unit 116 or be communicably connected to the control unit 116. The object detector 118 detects one or more objects in the images of the data 110. The one or more objects can include large scale objects, such as fish, as well as smaller objects, such as key points of the fish.

In the example of FIG. 1, the object detector 118 detects the fish 113 and the fish 115 in the image 112. The object detector 118 can compute a bounding box for each detection. For example, the object detector 118 can compute a bounding box 118a indicating a location of the fish 113 and a bounding box 118b indicating a location of the fish 115. The object detector 118 can compute a bounding boxes for key points 118c. Instead of bounding boxes, other types of data indicating a location can be used, such as a specific location specified by one or more values (e.g., x and y values in a coordinate plane of the image 112, spherical coordinates, among others).

The object detector 118 detects key points 118c of the fish 113 and fish 115. As shown in FIG. 1, the key points 118c of the fish 113 and the fish 115 represent locations on the fish 113 and the fish 115. The locations can include a mouth, upper fin, tail, eye, among others. The object detector 118 can include one or more machine learning models. The machine learning models can be trained to detect key points as well as objects such as fish. In some implementations, the machine learning models are trained by the control unit 116.

In some implementations, machine learning models of the object detector 118 are trained to detect key points. For example, the object detector 118 can obtain images including one or more key points. The object detector 118 can determine a predicted location for each of the one or more key points. The object detector 118 can obtain ground truth data indicating an actual location for each of the one or more key points. Based on comparing the ground truth data to the predicted location for the one or more key points, the object detector 118 can determine an error term. The object detector 118 can then adjust one or more parameters of the machine learning models according to the error term in order to improve subsequent predictions.

In some implementations, machine learning models of the object detector 118 are trained to detect fish or other animals. For example, the object detector 118 can obtain images including one or more depictions of fish. The object detector 118 can determine a predicted location for the one or more depictions of fish. The object detector 118 can obtain ground truth data indicating an actual location for the depicted fish. Based on comparing the ground truth data to the predicted location for the depicted fish, the object detector 118 can determine an error term. The object detector 118 can then adjust one or more parameters of the machine learning models according to the error term in order to improve subsequent predictions.

The truss network engine 114 obtains detected objects from the object detector 118. In some implementations, the control unit 116 obtains detected object data from the object detector 118 and provides the detected object data to the truss network engine 114. The truss network engine 114 generates truss networks 120a and 120b for the fish 113 and the fish 115, respectively. The truss network 120b for the fish 115 is shown in more detail in FIG. 3. In general, the truss networks 120a and 120b indicate distances between locations detected on the fish 113 and 115. These distances can be associated with unique properties of the fish such as biomass, identity, or health.

In some implementations, the truss networks 120a and 120b are two dimensional (2d) truss networks. For example, the truss network engine 114 determines a distance between a first key point of the key points 118c and a second key point of the key points 118c based on a number of pixels in the image 112 separating the first key point from the second key point. Such a determination does not rely on depth information from the image 112. Truss lengths generated in such a way may inaccurately indicate features of a fish, such as biomass, based on a pose of the fish (e.g., truss lengths for fish faced head on towards the camera 102 can appear smaller than they would if the fish was faced side on). However, by processing generated truss networks in aggregate, the biomass engine 124 can generate accurate predictions for the population of fish 106 as historical training data likely has a similar distribution of fish poses and corresponding generated truss networks. The control unit 116 can generate accurate biomass distributions for the fish 106.

The truss network engine 114 generates truss data 122 including the truss networks 120a and 120b. In some implementations, the truss data 122 includes truss networks generated for multiple fish, such as all the fish 106. The biomass engine 124 obtains the truss data 122. In some implementations, the control unit 116 obtains the truss data 122, including the truss networks 120a and 120b, and provides the truss data to the biomass engine 124.

The biomass engine 124 generates a biomass distribution 126 based on the truss data 122. In some implementations, the biomass engine 124 includes one or more machine learning models trained to generate biomass distributions for one or more fish. For example, the biomass engine 124 can obtain truss networks for a population of fish. The biomass engine 124, and one or more models therein, can generate a predicted biomass distribution for the population of fish based on the obtained truss networks. The biomass engine 124 can then compare the predicted biomass distribution with a known, or previously calculated, biomass distribution for the population of fish. The biomass engine 124 can adjust one or more parameters of the one or more machine learning models of the biomass engine 124 based on a result of comparing the predicted biomass distribution to the known biomass distribution. Various training techniques, including gradient descent, backpropagation, among others, can be used in training models of components of the control unit 116, including the biomass engine 124 component.

The known biomass distribution can be determined using one or more algorithms, models, or manual weighing of fish. The population of fish from which training data is derived can be different from the fish 106. The population of fish can be stored in a historical database including records from previous populations of fish. In some implementations, the control unit 116, or processors configured to operate similar to the control unit 116, generates truss data and provides the truss data to a database for later use in training. For example, the control unit 116 can provide the truss data 122 to a database. The truss data 122 can be stored and used for later processes, such as subsequent training of one or more models. In general, training data can include 2d truss networks as described herein.

The biomass distribution 126 generated by the biomass engine 124 includes one or more biomasses, corresponding to one or more fish, of the fish 106. In the example of FIG. 1, a number of fish corresponding to ranges of biomass is determined by the biomass engine 124. For example, the biomass engine 124 can determine that two fish correspond to biomass range 3.5 kilogram to 3.7 kilogram and three fish correspond to the biomass range 3.7 kilogram to 3.8 kilogram. In some implementations, the ranges are predetermined. In some implementations, the ranges are dynamically chosen by the control unit 116 based on the number of fish and the distribution of biomasses. In some implementations, the biomass distribution 126 is a histogram.

The biomass engine 124 generates the biomass distribution 126 and provides the biomass distribution 126 to the decision engine 128. The decision engine 128 obtains the biomass distribution 126. In stage C, the control unit 116 determines an action based on the biomass distribution 126. In some implementations, the control unit 116 provides the biomass distribution 126, including one or more biomass estimation values, to the decision engine 128.

In some implementations, the biomass engine 124 generates the biomass distribution 126 that includes likelihoods that a number of fish of the fish 106 are a particular biomass or within a range of biomass. For example, weight ranges for the biomass distribution 126 can include ranges from 3 to 3.1 kilograms (kg), 3.1 to 3.2 kg, and 3.2 to 3.3 kg. A likelihood that a number of the fish 106 are within the first range, 3 to 3.1 kg, can be 10 percent. A likelihood that the number of the fish 106 are within the second or third range, 3.1 to 3.2 kg or 3.2 to 3.3 kg, respectively, can be 15 percent and 13 percent. In general, the sum of all likelihoods across all weight ranges can be normalized (e.g., equal to a value, such as 1, or percent such as 100 percent).

In some implementations, the decision engine 128 determines a portion of the fish 106, based on data generated by the biomass engine 124, are below an expected weight or below weights of others of the fish 106. For example, the decision engine 128 can determine subpopulations within the fish 106 and determine one or more actions based on the determined subpopulations, such as actions to mitigate or correct for issues (e.g., runting, health issues, infections, disfiguration, among others). Actions can include feed adjustment, sorting, model training, and user report feedback, among others.

In some implementations, the decision engine 128 detects one or more features of the biomass estimations of the biomass distribution 126. For example, the decision engine 128 can detect one or more subpopulations. Subpopulations can include runt fish, healthy fish, diseased fish, among others. For example, a Gaussian-like shape in the biomass distribution 126 can indicate a subpopulation. In the example of FIG. 1, the biomass distribution 126 includes at least two subpopulations with one having a smaller average biomass than the other. The control unit 116 can determine the subpopulation with the smaller average biomass is a runt population based on a comparison with runt population criteria, such as a runt population average biomass threshold, among others.

In some implementations, the decision engine 128 detects a runt subpopulation based on processing the biomass distribution 126. For example, the decision engine 128 can include one or more algorithms or trained models to detect groups within a distribution of data. The decision engine 128 can include one or more processors configured to perform clustering algorithms such as k-mean, partitioning methods, hierarchical clustering, fuzzy clustering, density-based clustering, model-based clustering, among others.

In some implementations, the control unit 116 determines an adjustment of feed using the feed controller unit 130 controlling the feed system 132. The control unit 116 can provide the biomass distribution 126 or a control signal to the feed controller unit 130. Depending on the data received from the control unit 116, the feed controller unit 130 can either process the biomass distribution 126 to determine an adjustment of feed and provide a control signal to the feed system 132 or can provide the control signal provided by the control unit 116 to the feed system 132.

In some implementations, the decision engine 128 does not detect a runt subpopulation. For example, the decision engine 128 can determine that the biomass distribution 126 does or does not satisfy a biomass requirement or threshold, such as a biomass requirement for distribution or sale. The decision engine 128 can determine, based on features of the biomass distribution 126, what action to perform.

For example, if one or more biomass estimations generated by the biomass engine 124 do not satisfy a threshold (e.g., the mean or median biomass is too large or too small), the control unit 116 can provide a control signal to a sorting actuator of a sorting system to sort one or more fish from the fish 106 or can provide a control signal to adjust a feeding of the fish 106. For example, the control unit 116 can sort the fish 106 based on biomass. The control unit 116 can send a signal to a sorting system that sorts fish based on one or more criteria, such as a threshold biomass, into multiple locations based on the one or more criteria.

In some implementations, the control unit 116 includes the feed controller unit 130. For example, the control unit 116 may control both the processing of the images in the data 110 and the adjustments to the feeding by controlling the feed system 132.

In some implementations, the control unit 116 adjusts feeding to provide feed to a certain area of the fish pen 104. For example, the obtained data 110 can include positions of the fish detected within the images of the obtained data 110. The control unit 116 can determine based on one or more subpopulations detected by the decision engine 128 of the control unit 116 that a given subpopulation requires additional feed.

The control unit 116 can send a control signal to the feed system 132 or to the control unit 130 for the feed system 132 configured to adjust the location of an output of feed. The control unit 116 can adjust the location of an output of feed to a location of one or more fish within a particular subpopulation or an average location of the subpopulation.

In some implementations, the feed system 132 includes multiple food types. For example, the controller unit 130 can provide control messages to the feed system 132 to change the food type provided to the fish 106. In some cases, the multiple food types include a medicated food type and a non-medicated food type. In some cases, the multiple food types include food with a particular nutritional value and food with a different nutritional value.

The controller unit 130 can determine, based on data from the control unit 116, which food to provide to the fish 106, how much food to provide, when to provide the food, and at what rate to provide the food. In general, the controller unit 130 can generate a meal plan based on data from the control unit 116, such as biomass estimations or a control signal generated based on biomass estimations, where the meal plan includes one or more of: a feed type, a feed rate, a feed time, and a feed amount.

In some implementations, the control unit 116 includes multiple computer processors. For example, the control unit 116 can include a first and a second computer processor communicably connected to one another. The first and the second computer processor can be connected by a wired or wireless connection. The first computer processor can perform one or more of the operations of the object detector 118, truss length engine 120, biomass engine 124, or the decision engine 128. The first computer processor can store or provide training data to train one or more models of the object detector 118, truss length engine 120, biomass engine 124, or the decision engine 128.

Similarly, the second computer processor can perform one or more of the operations of the object detector 118, truss length engine 120, biomass engine 124, or the decision engine 128. The second computer processor can store or provide the training data to train one or more models of the object detector 118, truss length engine 120, biomass engine 124, or the decision engine 128. Operations not performed by the first computer processor can be performed by the second computer processor or an additional computer processor. Operations not performed by the second computer processor can be performed by the first computer processor or an additional computer processor.

In some implementations, the control unit 116 operates one or more processing components, such as the object detector 118, truss length engine 120, biomass engine 124, or the decision engine 128. In some implementations, the control unit 116 communicates with an external processor that operates one or more of the processing components. The control unit 116 can store training data, or other data used to train one or more models of the processing components, or can communicate with an external storage device that stores data including training data.

In some implementations, models of the components of the control unit 116 include one or more fully or partially connected layers. Each of the layers can include one or more parameter values indicating an output of the layers. The layers of the models can generate output for each of the components, such as the object detector 118, truss length engine 120, biomass engine 124, or the decision engine 128.

In general, the control unit 116 can process one or more images of the data 110 in aggregate or process each image of the data 110 individually. In some implementations, one or more components of the control unit 116 process items of the data individually and one or more components of the control unit 116 process the data 110 in aggregate. For example, the object detector 118 can process each image of the data 110 individually. Similarly, the truss length engine 120 can obtain data from the object detector 118 and process each truss network for each detected fish. In some implementations, parallel processes of the object detector 118 and the truss length engine 120 generate object detections and truss lengths corresponding to the object detections for multiple fish at a time. For example, a first process of detecting a fish object and then determining a truss network for that fish can proceed as a parallel process with a second process of detecting another fish object and then determining a truss network for that fish.

In general, processing individually as discussed herein, can include processing one or more items sequentially or in parallel using one or more processors. In some implementations, the decision engine 128 processes data in aggregate. For example, the decision engine 128 can determine, based on one or more data values indicating biomass estimates provided by the biomass engine 124, one or more decisions and related actions, as described herein. In general, processing in aggregate as discussed herein, can include processing data corresponding to two or more items of the data 110 to generate a single result. In some implementations, an item of the data 110 includes the image 112.

Figure 2:
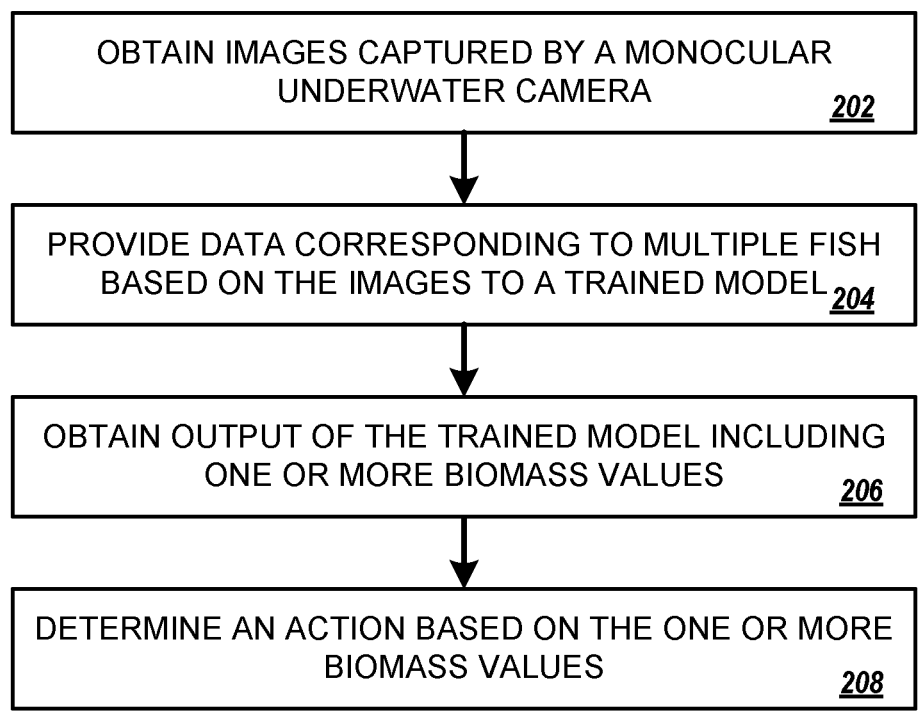
FIG. 2 is a flow diagram showing an example of a system for monocular underwater camera biomass estimation.

FIG. 2 is a flow diagram showing an example of a process 200 for monocular underwater camera biomass estimation. The process 200 may be performed by one or more systems, for example, the system 100 of FIG. 1.

The process 200 includes obtaining images captured by a monocular underwater camera (202). For example, the control unit 116 obtains images of the image data 110 captured by the camera device 102. The camera device 102 can include a single camera. The camera device 102 with a single camera can be more efficient to produce and maintain, more economical, and can be more robust with fewer components prone to failure.

The process 200 includes providing data corresponding to multiple fish based on the images to a trained model (204). For example, the control unit 116 provides the image data 110 to the object detector 118 trained to detect objects in images of the image data 110. In another example, the control unit 116 provides the image data 110 to the object detector 118 and the truss length engine 120 to generate the truss data 122. The control unit 116 then provides the truss data 122 to the biomass engine 124. The biomass engine 124 includes one or more models trained to determine one or more biomass estimations based on one or more input truss networks.

The process 200 includes obtaining output of the trained model including one or more biomass values (206). For example, the control unit 116 can obtain output of the models, including the object detector 118 and the biomass engine 124. The output of the object detector 118 can include detected objects such as fish or key points. The output of the biomass engine 124 can include biomass distribution 126.

The process 200 includes determining an action based on the one or more biomass values (208). For example, the control unit 116 can determine to adjust a feeding of the fish pen 104 based on the detected objects and the biomass distribution 126. The decision engine 128 component of the control unit 116 can choose from one or more available actions, e.g., available actions obtained from data or provided by a user. In the example of FIG. 1, the available actions include feed adjustment. The control unit 116 can provide a signal to the feed controller unit 130 to adjust the feed for the fish pen 104.

In some implementations, the action includes sending data including the biomass distribution 126 to a user device, where the data is configured to, when displayed on the user device, present a user of the user device with a visual representation of the biomass distribution 126. For example, the control unit 116 can generate a data signal that includes an indication of one or more biomass estimates, such as the biomass distribution 126. In some implementations, the control unit 116 waits for feedback from a user provided a visual representation of a biomass estimate to confirm an action determined by the decision engine 128, such as a feed adjustment.

In some implementations, the control unit 116 obtains data from a monocular underwater camera indicating a current operation status of the monocular underwater camera and, in response to obtaining an image of a fish, provides the image of the fish to a trained model. For example, the camera 102 may include a dysfunctional stereo camera pair. The dysfunction can result in images without the depth data provided by the stereo effect of the cameras. To mitigate this situation, the camera device 102 can send a signal to the control unit 116 indicating a camera of a stereo pair is dysfunctional after the camera device 102 determines a camera of a stereo pair has become dysfunctional. In response to the signal, the control unit 116 can process images obtained from the camera device 102 as discussed herein.

In some implementations, the control unit 116 determines, based on the data 110 or other data provided by the camera device 102, the images from the camera device 102 do not include depth data. For example, the control unit 116 can process the data 110 and determine that images lack a stereo feature. In response, the control unit 116 can process the images to determine a biomass distribution without this additional depth data. For example, as discussed herein, the control unit 116 can generate a group of truss networks for a population of fish, such as the fish 106, and provide the group of truss networks to the biomass engine 124 to determine a biomass distribution for the fish 106.

The processing switch can be automatic such that, intermediate data processing issues or environmental effects, such as fish or debris obfuscating or blocking an image of a stereo pair, can be detected by the control unit 116 and the control unit 116 can determine to process corresponding images as described herein.

Figure 3:
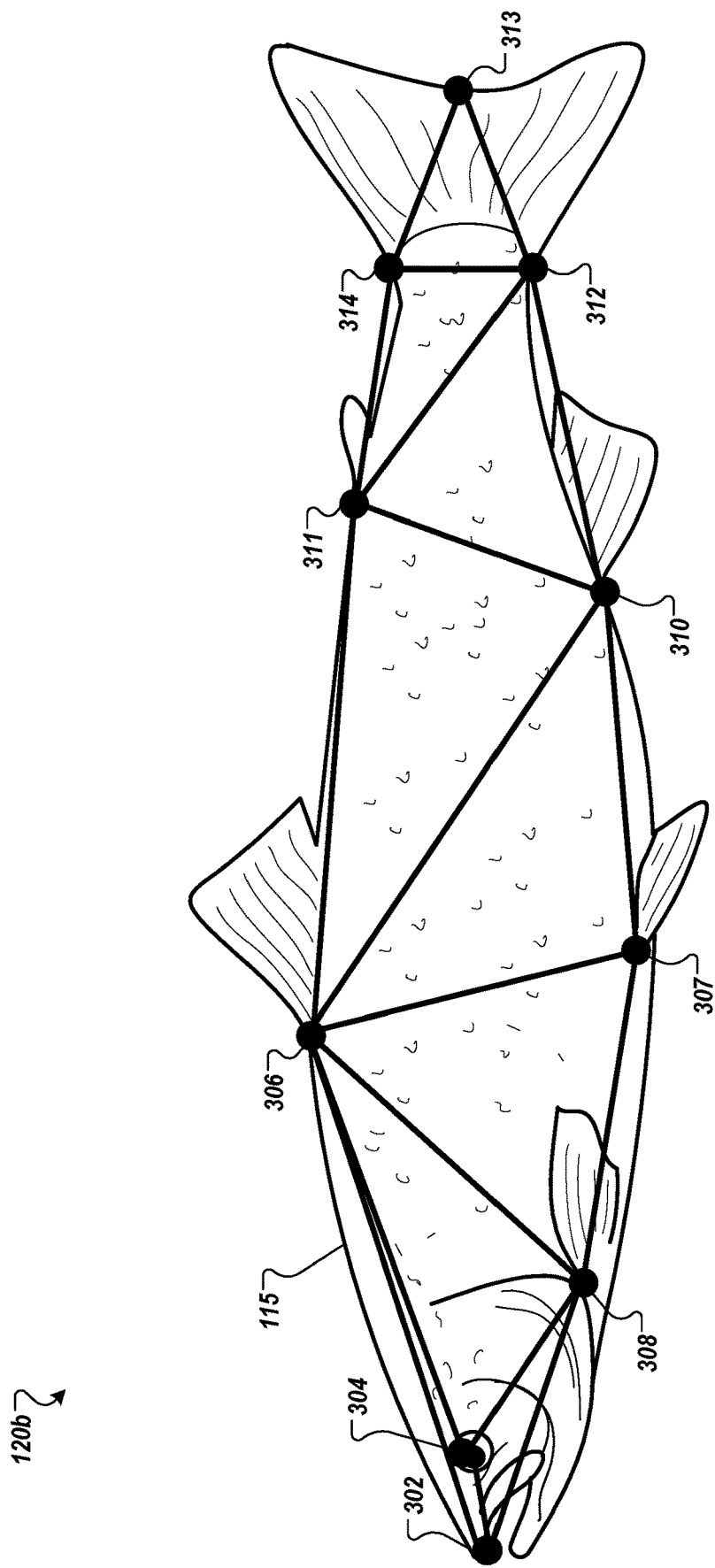
FIG. 3 is a diagram showing an example of a truss network.

FIG. 3 is a diagram showing an example of a truss network 120b. FIG. 3 shows truss lengths and key points computed for the fish 115 by the system 100 shown in FIG. 1. The truss lengths between key points are used to extract information about the fish including a weight of the fish. Various trusses, or lengths between key points, of the fish can be used. FIG. 3 shows a number of possible truss lengths including upper lip 302 to eye 304, upper lip 302 to leading edge dorsal fin 306, upper lip 302 to leading edge pectoral fin 308, leading edge dorsal fin 306 to leading edge anal fin 310, leading edge anal fin 310 to trailing low caudal peduncle 312, trailing lower caudal peduncle 312 to trailing upper caudal peduncle 314. Other key points and other separations, including permutations of key points mentioned, can be used. For different fish, or different species of fish, different key points may be generated. For any set of key points, a truss network may be generated as a model.

Other truss lengths not shown can be used by the system 100. For example, a truss length from the upper lip 302 to the tail 313 can be used as the length of the fish 115 and included in a collection of one or more truss length measurements and provided to the biomass engine 124 to generate a biomass distribution. In addition, specific truss lengths can be used to recognize specific deformities. Deformities such as shortened operculum can be detected using truss lengths such as a truss length from the upper lip 302 to the gill. Processing one or more images of a fish can include determining any of the following health conditions: shortened abdomen, shortened tail, scoliosis, lordosis, kyphosis, deformed upper jaw, deformed lower jaw, shortened operculum, runting or cardiomyopathy syndrome (CMS).

In some implementations, a biomass distribution, such as the biomass distribution 126, includes health data related to one or more fish represented in a distribution. For example, the biomass engine 124 can generate a distribution of one or more fish that includes health probabilities as well as, or instead of, biomass data. The health probabilities can be used to determine various remedial actions including providing medicated feed or moving the fish to a system for treatment, such as delousing.

Figure 4:
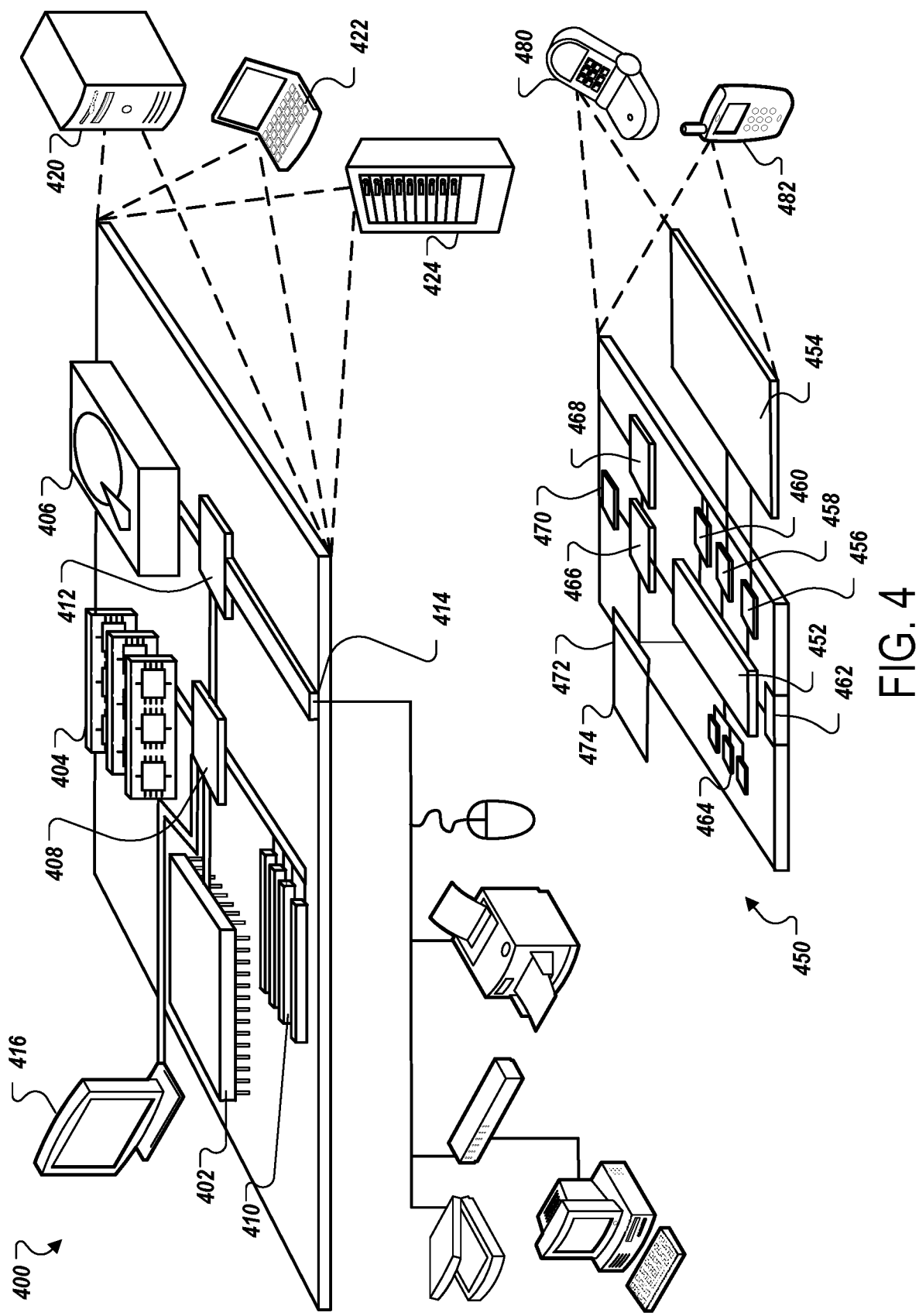
FIG. 4 is a diagram illustrating an example of a computing system used for monocular underwater camera biomass estimation.

FIG. 4 is a diagram illustrating an example of a computing system used for monocular underwater camera biomass estimation. The computing system includes computing device 400 and a mobile computing device 450 that can be used to implement the techniques described herein. For example, one or more components of the system 100 could be an example of the computing device 400 or the mobile computing device 450, such as a computer system implementing the control unit 116, devices that access information from the control unit 116, or a server that accesses or stores information regarding the operations performed by the control unit 116.

The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 402 is a single threaded processor. In some implementations, the processor 402 is a multi-threaded processor. In some implementations, the processor 402 is a quantum computer.

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine readable mediums (for example, the memory 404, the storage device 406, or memory on the processor 402). The high-speed interface 408 manages bandwidth-intensive operations for the computing device 400, while the low-speed interface 412 manages lower bandwidth-intensive operations. Such allocation of functions is an example only. In some implementations, the high speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device, such as a mobile computing device 450. Each of such devices may include one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may include appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (nonvolatile random access memory), as discussed below. In some implementations, instructions are stored in an information carrier such that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry in some cases. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 4G/6G cellular, among others. Such communication may occur, for example, through the transceiver 468 using a radio frequency. In addition, short-range communication may occur, such as using a Bluetooth, Wi-Fi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, among others) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims can be performed in a different order and still achieve desirable results.

What is claimed is:

1. A method comprising:
   obtaining a plurality of images of fish captured by a stereo camera device that comprises a pair of monocular underwater cameras;
   determining that one of the pair of monocular underwater cameras is at least partially obscured or is at least partially non-functional;
   in response to determining that one of the pair of monocular underwater cameras is at least partially obscured or is at least partially non-functional, providing the plurality of images that were captured by the other monocular underwater camera of the pair of monocular underwater cameras to a first model trained to detect one or more fish within the plurality of images from a single viewpoint;

generating one or more values for each detected fish as a set of values;

generating a biomass distribution of the fish based on the set of values; and determining an action based on the biomass distribution.

2. The method of claim 1, wherein generating the biomass distribution of the fish based on the set of values comprises:
providing the set of values to a second model trained to estimate biomass distributions; and
obtaining output of the second model as the biomass distribution of the fish.

3. The method of claim 1, wherein the one or more values for each detected fish comprise:
a value that indicates a length between a first point on a particular fish of the fish and a second point on the particular fish.

4. The method of claim 3, comprising:
detecting the first point and second point on the particular fish.

5. The method of claim 1, wherein the action comprises:
adjusting a feeding system providing feed to the fish.

6. The method of claim 1, wherein the action comprises:
sending data including the biomass estimate to a user device, wherein the data is configured to, when displayed on the user device, present a user of the user device with a visual representation of the biomass estimate.

7. The method of claim 1, wherein the stereo camera device comprises at least two models, comprising:
the first model that is trained to detect the one or more fish within the plurality of images from the single viewpoint when the one of the pair of monocular underwater cameras is at least partially obscured or is at least partially non-functional, and
a stereo model that is trained to detect the one or more fish within the plurality of images from stereo images generated by the pair of monocular underwater cameras.

8. A non-transitory, computer-readable medium storing one or more instructions executable by a computer system to perform operations comprising:
obtaining a plurality of images of fish captured by a stereo camera device that comprises a pair of monocular underwater cameras;
determining that one of the pair of monocular underwater cameras is at least partially obscured or is at least partially non-functional;
in response to determining that one of the pair of monocular underwater cameras is at least partially obscured or is at least partially non-functional, providing the plurality of images that were captured by the other monocular underwater camera of the pair of monocular underwater cameras to a first model trained to detect one or more fish within the plurality of images from a single viewpoint;
generating one or more values for each detected fish as a set of values;
generating a biomass distribution of the fish based on the set of values; and
determining an action based on the biomass distribution.

9. The medium of claim 8, wherein generating the biomass distribution of the fish based on the set of values comprises:
providing the set of values to a second model trained to estimate biomass distributions; and
obtaining output of the second model as the biomass distribution of the fish.

10. The medium of claim 8, wherein the one or more values for each detected fish comprise:
a value that indicates a length between a first point on a particular fish of the fish and a second point on the particular fish.

11. The medium of claim 10, wherein the operations comprise:
detecting the first point and second point on the particular fish.

12. The medium of claim 8, wherein the action comprises:
adjusting a feeding system providing feed to the fish.

13. The medium of claim 8, wherein the action comprises:
sending data including the biomass estimate to a user device, wherein the data is configured to, when displayed on the user device, present a user of the user device with a visual representation of the biomass estimate.

14. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining a plurality of images of fish captured by a stereo camera device that comprises a pair of monocular underwater cameras;
determining that one of the pair of monocular underwater cameras is at least partially obscured or is at least partially non-functional;
in response to determining that one of the pair of monocular underwater cameras is at least partially obscured or is at least partially non-functional, providing the plurality of images that were captured by the other monocular underwater camera of the pair of monocular underwater cameras to a first model trained to detect one or more fish within the plurality of images from a single viewpoint;
generating one or more values for each detected fish as a set of values;
generating a biomass distribution of the fish based on the set of values; and
determining an action based on the biomass distribution.

15. The system of claim 14, wherein generating the biomass distribution of the fish based on the set of values comprises:
providing the set of values to a second model trained to estimate biomass distributions; and
obtaining output of the second model as the biomass distribution of the fish.

16. The system of claim 14, wherein the one or more values for each detected fish comprise:
a value that indicates a length between a first point on a particular fish of the fish and a second point on the particular fish.

17. The system of claim 16, wherein the operations comprise:
detecting the first point and second point on the particular fish.

18. The system of claim 14, wherein the action comprises: adjusting a feeding system providing feed to the fish.

19. The system of claim 14, wherein the action comprises: sending data including the biomass estimate to a user device, wherein the data is configured to, when displayed on the user device, present a user of the user device with a visual representation of the biomass estimate.

* * * * *